US008291671B2

United States Patent

(12) United States Patent
Vera Villares et al.

(10) Patent No.: US 8,291,671 B2
(45) Date of Patent: Oct. 23, 2012

(54) JOINT ARRANGEMENT FOR COMPOSITE-MATERIAL STRUCTURAL MEMBERS

(75) Inventors: Enrique Vera Villares, Madrid (ES); Jose Maria Pina Lopez, Madrid (ES)

(73) Assignee: Airbus Operations S.L., Madrid (ES)

( * ) Notice: Subject to any disclaimer, the term of this patent is extended or adjusted under 35 U.S.C. 154(b) by 592 days.

(21) Appl. No.: 12/474,394

(22) Filed: May 29, 2009

(65) Prior Publication Data

US 2010/0243804 A1 Sep. 30, 2010

(30) Foreign Application Priority Data

Mar. 25, 2009 (ES) .................................. 200900810

(51) Int. Cl.
*E04B 1/38* (2006.01)
*B64C 1/00* (2006.01)

(52) U.S. Cl. ............ 52/664; 52/665; 403/187; 403/217; 403/245; 244/119; 244/131

(58) Field of Classification Search .................... 52/664, 52/665, 669, 655.1, 383, 841; 403/174, 178, 403/187, 237, 387, 232.1, 217, 245; 244/119, 244/133, 131; 428/53, 61, 105, 107, 109, 428/113, 298.1
See application file for complete search history.

(56) References Cited

U.S. PATENT DOCUMENTS 1,678,013 A * 7/1928 McIntyre ...................... 403/217
2,146,333 A * 2/1939 Deming ........................ 403/231
3,787,130 A * 1/1974 Hemmings et al. ........... 403/205
3,798,865 A * 3/1974 Curtis ............................ 52/665
3,989,399 A * 11/1976 Slowbe ......................... 403/245
4,047,348 A * 9/1977 McSweeney .............. 52/506.06
4,190,996 A * 3/1980 Schindler et al. .......... 52/309.13
4,331,495 A * 5/1982 Lackman et al. ............... 156/93
4,761,930 A * 8/1988 Tepera ............................ 52/669
4,786,343 A * 11/1988 Hertzberg ....................... 156/93
5,154,031 A * 10/1992 Wall ........................... 52/506.06
5,396,748 A * 3/1995 Rogers ............................ 52/664
6,003,898 A * 12/1999 Teply et al. ................... 280/785
6,511,570 B2 * 1/2003 Matsui .......................... 156/245
6,523,246 B1 * 2/2003 Matsui et al. .................. 29/559
7,001,097 B2 * 2/2006 Wang et al. ................... 403/231
7,690,721 B2 * 4/2010 Gruneklee et al. ....... 296/203.01
2003/0097809 A1 * 5/2003 Li ............................. 52/506.07
2004/0040252 A1 * 3/2004 Beral et al. ................... 52/729.3
2006/0060705 A1 * 3/2006 Stulc et al. .................... 244/119
2006/0249626 A1 * 11/2006 Simpson et al. ........... 244/123.1
2009/0057487 A1 * 3/2009 Velicki et al. ................. 244/119
2009/0266936 A1 * 10/2009 Fernandez et al. ............ 244/119
2009/0320398 A1 * 12/2009 Gouvea ....................... 52/309.1

* cited by examiner

*Primary Examiner* — Robert Canfield
(74) *Attorney, Agent, or Firm* — Oblon, Spivak, McClelland, Maier & Neustadt, L.L.P.

(57) ABSTRACT

A joint arrangement for composite-material structural members in components including a skin and a plurality of structural members, applicable to pairs of first and second intersecting structural members, such as a beam and a frame in an aircraft fuselage, both members having a configuration which includes webs, inner flanges and outer flanges, in which, in the zone of intersection between said members, the laminations of one or both flanges of the first member include transverse flaps which are joined to one or both flanges of the ends of the segments of the second member which are separated at the intersection, acting as means for transmission of loads between them.

9 Claims, 3 Drawing Sheets

55 53 4. 4. 23 43 21 41 57 45 33 25 59 3. 3. 31 35 11

JOINT ARRANGEMENT FOR COMPOSITE-MATERIAL STRUCTURAL MEMBERS

FIELD OF THE INVENTION

The present invention relates to a joint arrangement for composite-material structural members and, more particularly, to a joint arrangement for structural members of an aircraft fuselage component.

PRIOR ART

At present and in particular in the aeronautical industry composite materials of organic origin and continuous fibres mainly based on epoxy resins and carbon fibres are widely used in a large variety of structural members.

Aircraft structures require, as is well known, the combination of various structural members. For example, fuselages require combination of the skin with various structural members such as beams, frames or stringers. Differently from the situation in the past where metallic materials were used and in practice the only option available was that of using mechanical joining parts to combine the different structural members of a given component, composite materials enable said combination to be achieved also by means of chemical bonding procedures.

In certain aircraft components which have pairs of intersecting members, the problem posed is that of how to achieve a joint arrangement which ensures the continuity of the load supported or transmitted by the member of the pair which is interrupted at the intersection. The rear section of the fuselage in an aircraft has components of this type where stringers, frames and beams intersect along its whole length.

In the known art, this problem is solved with a joint arrangement between the two structural members which uses an additional part joined both to the two segments of the interrupted member (a frame in the example mentioned) and to the other structural member (a beam in the example mentioned).

In an increasingly competitive market it is necessary to produce structures which are optimized as far as possible and in the least possible time. Generally speaking, it may be considered that the large-scale combination of parts in a single manufacturing cycle involves a complex tooling system, although it facilitates weight optimization of the component and eliminates recurrent costs with the elimination of assembly operations. On the other hand, the manufacture of simple parts which are joined together during a final bonded or riveted joining process usually involves tools which are much simpler, but normally at the cost of an increase in weight. In this context, it is desirable to reduce the number of parts in the intersection zone of said structural members and simplify their assembly process.

The present invention aims to satisfy this need.

SUMMARY OF THE INVENTION

One object of the present invention is to provide a joint arrangement at the intersection of structural members made of composite material, which facilitates the manufacture of a component which includes a plurality of structural members intersecting in the form of a single part.

Another object of the present invention is to provide a joint arrangement at an intersection of structural members made of composite material, which facilitates weight optimization of a component which includes a plurality of intersecting structural members.

In a component made of a composite material and comprising a skin and a plurality of structural members such as beams and frames, these and other objects are achieved with a joint arrangement between pairs of first and second intersecting structural members, both structural members having a configuration which includes webs and inner and outer flanges and the second member being separated into two segments in the intersection zone, in which, in the zone of intersection between said structural members, the laminations of the two flanges of the first member, or those of the inner flange only, include transverse flaps which are joined to the ends of the segments of the second member, acting as means for transmission of loads between them.

In a preferred embodiment of the present invention said flaps are formed with extensions of those plies of the laminations of the flanges of the first member which are oriented at 90° relative to its longitudinal direction. It is thus possible to achieve a joint arrangement which allows continuity of the load in the second member in the intersection zone, making it possible to manufacture the component as a single piece using a means present in the first member.

In another preferred embodiment of the present invention the component forms part of an aircraft fuselage and said first and second members are, respectively, beams and frames thereof. It is thus possible to optimize the process for manufacture of said fuselage.

Other characteristic features and advantages of the present invention will emerge from the detailed description which follows of an example of embodiment of the subject of the invention with reference to the accompanying figures.

DETAILED DESCRIPTION OF THE INVENTION

Figure 1A:
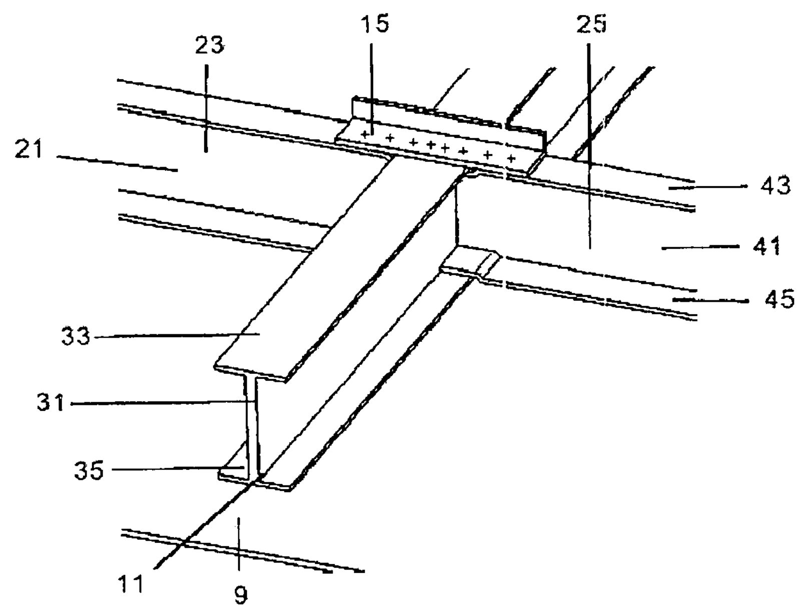
FIGS. 1*a* and 1*b* are, respectively, a perspective view and a plan view of a joint arrangement, known in the art, between a beam and a frame of a component of an aircraft fuselage.

The description below relates to an embodiment of the invention applicable to an arrangement for joining together a beam 11 and a frame 21 of an aircraft fuselage, which are both made of a composite material consisting of carbon fibre reinforced plastic (CFRP). The beam 11 has a cross-section in the form of a double T and the frame 21 has a cross-section in the form of a C with, respectively, webs 31, 41, inner flanges 33, 43 and outer flanges 35, 45.

As will be evident to the person skilled in the art the invention is applicable to joint arrangements of structural members with other configurations and in particular to configurations in which the second member 21 has a double T or Z shape, namely configurations with webs and flanges which are similar for the purposes of the present invention to those of the C-shaped configuration.

Figure 1B:
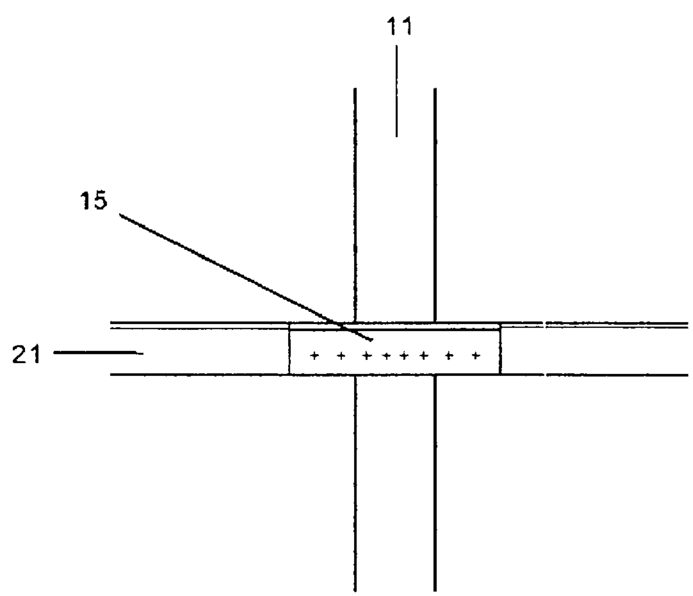

Firstly, a joint arrangement according to the prior art will be described with reference to FIGS. 1*a* and 1*b*. In the zone of intersection with the beam 11, the frame 21 is interrupted, resulting in two different segments 23, 25 and creating a discontinuous zone in its inner flange 43 and in its outer flange 45. As regards the outer flange 35 of the beam 11 and the outer flange 45 of the two segments 23, 25 of the frame 21, they are joined to the skin 9.

In a known joint arrangement the continuity of the inner flange 43 of the frame 21 is ensured by means of an additional part 15, typically a steel angle, which is riveted both to the inner flange 43 of the segments 23, 25 of the frame 21 and to the inner flange 33 of the beam 11. This joint arrangement has a negative impact on the weight of the assembly, with the introduction of the additional weight of the part 15 and the weight of the associated elements for performing riveting to the beam 11 and to the frame 21, and on the manufacturing time since additional assembly operations are required.

Figure 2A:
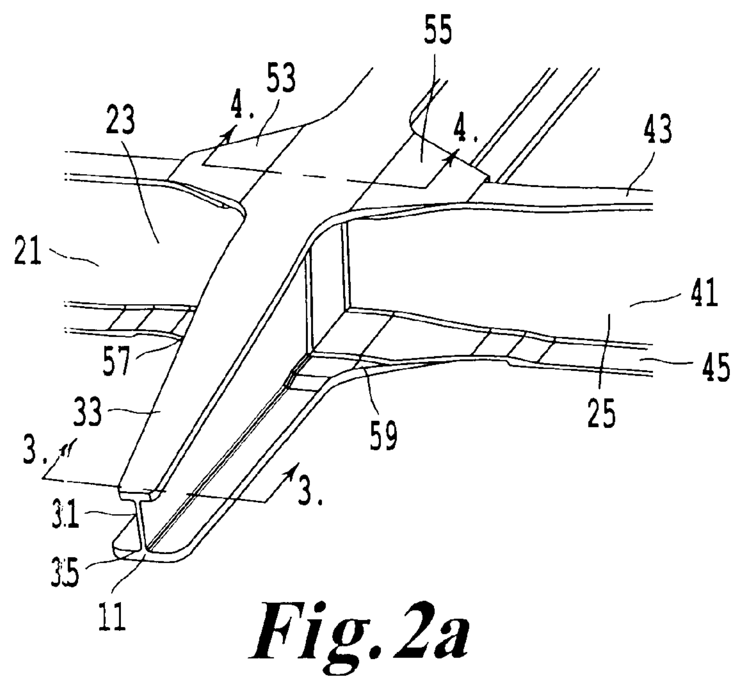
FIGS. 2*a* and 2*b* are, respectively, a perspective view and a plan view, of a joint arrangement according to the present invention between a beam and a frame of a component of an aircraft fuselage.
Figure 2B:
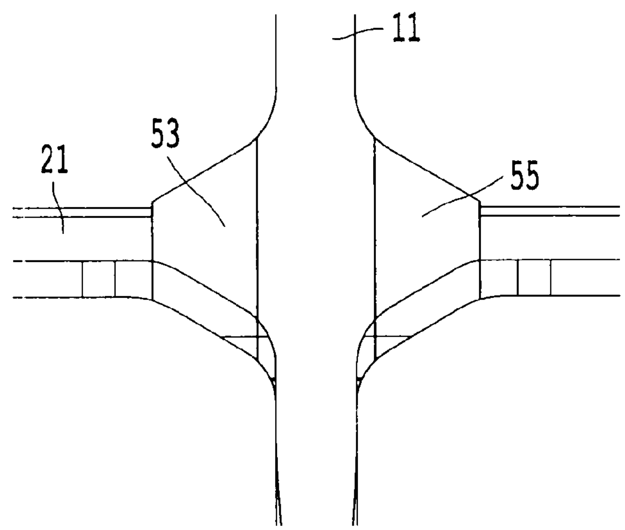

According to a preferred embodiment of the present invention and as shown in FIGS. 2*a* and 2*b*, the joint arrangement between the beam 11 and the frame 21 is achieved by means of first transverse flaps 53, 55 of the laminations of the inner flange 33 of the beam 11 which are joined to the inner flange 43 of the segments 23, 25 of the frame 21 and second transverse flaps 57, 59 of the laminations of the outer flange 35 of the beam 11 which are joined to the outer flange 45 of the segments 23, 25 of the frame 21, acting as means for transmission of loads between each of the inner flanges 43 and the outer flanges 45 of said segments 23, 25.

As shown in FIGS. 2*a* and 2*b*, both the ends of the inner flange 43 of the segments 23 and 25 of the frame 21 and the flaps 53 and 55 have a trapezoidal shape in plan view. This shape is intended, on the one hand, to ensure that any load transmission between one member and another is not sudden, in this case the angle being 45°. On the other hand, the flap zone is broadened so as to provide a greater bonding area for transfer of the load and, if necessary, for repair in this zone.

As is well known, the laminations of the different members of the beam 11 and the frame 21 involve the arrangement of plies of composite material in certain directions, more specifically at 0°, 90°, 45° and −45°. The number of layers (thickness) and their arrangement in certain directions or others are determined by strength factors.

Figure 3:
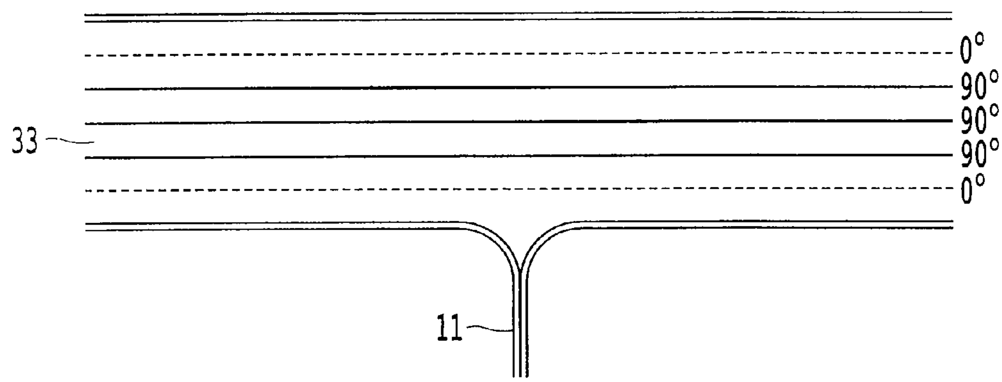
FIG. 3 shows schematically the structure of the laminations of the inner flange of the beam.
Figure 4:
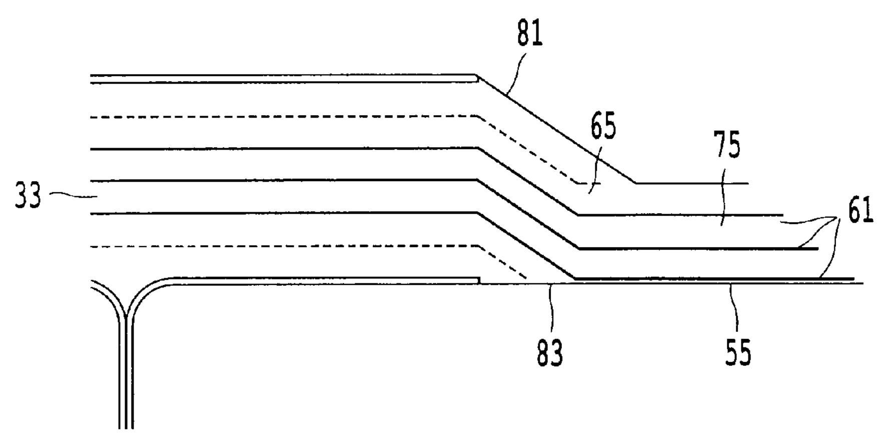
FIG. 4 shows schematically the extensions of the laminations of the flange of the beam in the zone of intersection with the frame.
Figure 5:
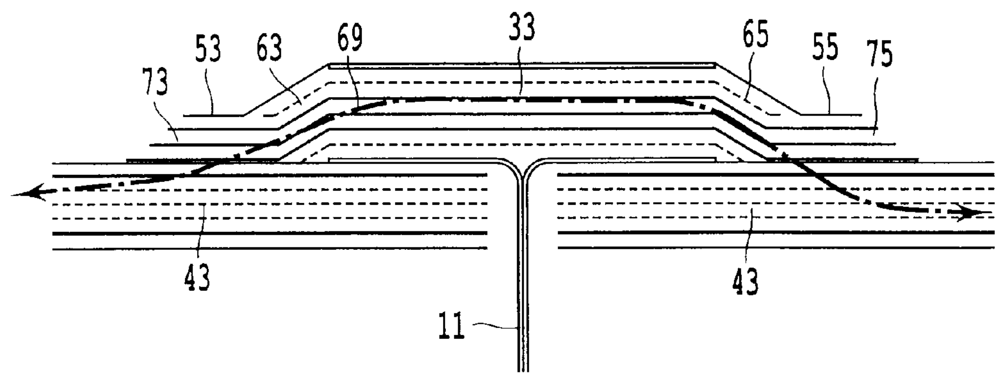
FIG. 5 illustrates schematically the transmission of loads along the frame with the joint arrangement according to the present invention.

In a preferred embodiment of the invention shown in FIGS. 4 and 5 it can be seen that the first transverse flaps 53, 55 are formed basically with extensions 61 of the 90° plies of the laminations of the inner flange 33 which is shown schematically in FIG. 3. These plies do not have a strength function in the flange 33 (this function is performed by the 0° plies, namely those with the carbon fibres oriented in the longitudinal direction of the beam 11).

In the direction of the frame 21, the flaps 53, 55 have transition zones 63, 65 with a trapezoidal cross-section where conveniently cutting of the plies with an orientation different from 90° and flat zones 73, 75 with solely 90° plies is performed. Although, in FIGS. 3, 4 and 5, only 0° and 90° plies have been shown for the sake of greater clarity, the stack in the flange 33 could contain alternating plies which have different orientations, e.g. 45°, 45°, 45°, 45°, 45°, 0°, 0°, 90°, 0°, 0° and their symmetric. In order to form the flaps, firstly all the inner plies less the 90° plies are cut, then the 90° plies are cut, leaving lastly the outer layers 81, 83 on the inside and outside of the flange 33 of the beam 11, which cover the entire stack.

In a preferred embodiment of the invention it is considered that the minimum number of 90° plies in the first flaps 53, 55 must be equal to the number of 0° plies in the inner flange 43 of the second member to which they are joined.

FIG. 5 shows clearly the path 69 for load transmission between the segments of the frame 21 which is achieved with the joint arrangement according to the present invention.

That stated above with regard to the first transverse flaps 53, 55 is applicable to the second transverse flaps 57, 59.

According to another preferred embodiment of the present invention the joint arrangement between the beam 11 and the frame 21 includes only the first transverse flaps 53, 55 of the laminations of the inner flange 33 of the beam 11, which are joined to the inner flange 43 of the segments 23, 25 of the frame 21. The load transmission between the outer flange 45 of the second member 21 in this case would occur through the skin 9.

With the joint arrangement according to the present invention various embodiments are possible as regards joining of the flaps 53, 55, 57, 59 to the flanges 43, 45 of the second member 21.

In a preferred embodiment chemical bonding using the RTM (Resin Transfer Moulding) process is used, this process involving injection of resin in a closed mould.

In another preferred embodiment chemical bonding based on a co-curing process, i.e. a process involving an open mould with vacuum bag, is used.

In another preferred embodiment mechanical joining by means of rivets is used.

Thus, an advantage of the present invention is that it reduces the manufacturing process time (or "lead time") since operations involving the assembly of additional parts is not required.

Another advantage of the present invention is the reduction in weight since additional parts are not required.

The preferred embodiment described above may be subject to those modifications included within the scope defined by the following claims.

The invention claimed is:

1. A joint arrangement in a component made of composite material, the joint arrangement comprising:

intersecting first and second structural members, the first and second intersecting structural members each having a configuration which includes webs, inner flanges and outer flanges and the second intersecting structural member being separated into two segments in a zone of intersection, wherein in the zone of intersection between said first and second intersecting structural members some plies of laminations of the inner flange of the first intersecting structural member include first transverse flaps extending further than other plies of the laminations and which are joined to the inner flange of ends of the segments of the second intersecting structural member, providing transmission of loads between the segments.

2. The joint arrangement according to claim 1, wherein in the zone of intersection between said first and second intersecting structural members, laminations of the outer flange of the first intersecting structural member include second transverse flaps which are joined to the outer flange of the ends of the segments of the second member, providing transmission of loads between the segments.

3. The joint arrangement according to claim 2, wherein said second transverse flaps or said first transverse flaps include along their entire length extensions of plies of the laminations of the outer flange or extensions of plies of the laminations of the inner flange of the first member which are oriented at 90° relative to the longitudinal direction thereof.

4. The joint arrangement according to claim 3, wherein a number of said plies oriented at 90° of the second transverse flaps or said first transverse flaps must be at least equal to a number of plies oriented at 0° in the outer flange or in the inner flange of the second member.

5. The joint arrangement according to claim 4, wherein joining of said second flaps or said first flaps to the outer flange or to the inner flange of the second member is performed during a stage involving consolidation of the composite material in a process for manufacturing the component as a single piece.

6. The joint arrangement according to claim 4, wherein joining of said second flaps or said first flaps to the outer flange or to the inner flange of the second member is performed using mechanical means.

7. The joint arrangement according to claim 1, wherein the first member is configured in the form of a double T and the second member is configured in one of the following forms: C, double T or Z.

8. The joint arrangement according to claim 2, wherein in the zone of intersection with the first member the outer flange or the inner flange of the segments of the second member as well as said second flaps or said first flaps have a trapezoidal shape in top view, the larger base thereof being adjacent to the first member.

9. The joint arrangement according to claim 1, wherein said component forms part of an aircraft fuselage and said first and second intersecting structural members are, respectively, beams and frames thereof.

* * * * *